United States Patent
Wilkomirsky

[11] Patent Number: 5,993,759
[45] Date of Patent: Nov. 30, 1999

[54] PRODUCTION OF LITHIUM CARBONATE FROM BRINES

[75] Inventor: Igor Wilkomirsky, Los Condes, Chile

[73] Assignee: Sociedad Minera Salar de Atacama S.A., Santiago, Chile

[21] Appl. No.: 08/827,463

[22] Filed: Mar. 28, 1997

[30] Foreign Application Priority Data

Mar. 28, 1996 [CL] Chile .......................................... 484-96

[51] Int. Cl.⁶ ................................................. C01D 15/08
[52] U.S. Cl. ...................... 423/179.5; 423/165; 423/186; 423/283; 23/302 R
[58] Field of Search ....................... 23/302 R; 423/179.5, 423/241, 283, 165, 186, 279

[56] References Cited

U.S. PATENT DOCUMENTS

| | | | |
|---|---|---|---|
| 1,298,932 | 4/1919 | Grunwald | 423/165 |
| 3,112,172 | 11/1963 | Archambault et al. | 423/179.5 |
| 3,268,289 | 8/1966 | Macey | 423/179.5 |
| 3,523,751 | 8/1970 | Burkert et al. | 423/179.5 |
| 3,855,392 | 12/1974 | Folkestad et al. | 423/283 |
| 4,115,219 | 9/1978 | Gancy et al. | 423/165 |
| 4,271,131 | 6/1981 | Brown et al. | 423/179.5 |
| 4,287,163 | 9/1981 | Garrett et al. | 423/179.5 |
| 4,588,566 | 5/1986 | Kluksdahl | 423/421 |
| 5,676,916 | 10/1997 | Wilkomirsky | 423/283 |

FOREIGN PATENT DOCUMENTS

| | | | |
|---|---|---|---|
| 1-115817 | 5/1989 | Japan | 423/165 |
| 701943 | 12/1979 | U.S.S.R. | 423/165 |
| 1824377 | 6/1993 | U.S.S.R. | 423/179.5 |
| 804962 | 11/1958 | United Kingdom | 423/179.5 |

*Primary Examiner*—Ngoc-Yen Nguyen
*Attorney, Agent, or Firm*—Birch, Stewart, Kolasch & Birch, LLP

[57] ABSTRACT

Lithium carbonate can be efficiently produced from a brine by (i) removing the boron therefrom, (ii) diluting the boron-free brine, (iii) removing magnesium from the diluted brine, and (iv) adding sodium carbonate to thereby precipitate lithium carbonate. By diluting the boron-free brine, the co-precipitation of lithium carbonate during the magnesium removal process is greatly reduced, thereby improving the recovery and purity of the lithium carbonate.

18 Claims, 1 Drawing Sheet

PRODUCTION OF LITHIUM CARBONATE FROM BRINES

BACKGROUND OF THE INVENTION

1. Field of the Invention

The present invention relates to a process for the production of lithium carbonate of high purity from natural or artificial brines which contain boron.

2. Description of the Related Arts

Lithium, the third element in the Periodic Table, has an atomic weight of 6.939 and occupies No. 32 among the elements of the earth's crust with an average concentration of only approximately 20 ppm, which confers it the characteristic of a rare metal. Despite this fact, lithium is found distributed in numerous minerals due to its chemical reactivity. However, there are very few commercial sources for producing lithium, the main one of these being the mineral spodumene, which is a double lithium-aluminum silicate, LiAl (SiO$_3$), which has a theoretical lithium content of 8.03%. Other minerals which are exploited are petalite, LiAl(Si$_4$O$_{10}$), which has a theoretical content of Li$_2$O of 4.88%, and lepidolite, which has a variable composition represented by the formula K$_2$(LiAl)$_3$(SiAl)$_4$O$_{10}$(OH,F)$_2$. These two minerals are used mostly as additives in special kinds of glass rather than for obtaining lithium. Another mineral of high potential value for obtaining lithium is hectorite, which is a low grade mineral with the composition Na$_{0.33}$(Mg,Li)$_3$Si$_4$O$_{10}$(OH,F)$_2$ and which is as yet not exploited for economic reasons, since its lithium content does not exceed 0.5%.

Other sources for obtaining lithium, which have grown in importance in the last two decades, are the brines of salt mines, geysers, and salt lakes, wherein lithium can be found generally in the form of chloride, sulfate, double potassium and magnesium, and as lithium borates. The lithium content in brines varies, from 0.02% as in the brines found in Clayton Valley in Nev., USA, to 0.2% at the Atacama Salt Mines in Chile. By evaporation of the brine and fractionated crystallization of the salts contained therein, it is possible to concentrate the lithium and obtain close to a 6% lithium content.

Besides lithium, natural brines also contain other elements like potassium, sodium, calcium, magnesium, iron, boron, bromine, chlorine, as well as nitrates, chlorides, sulfates, and carbonates. This requires that each brine be treated in a particular manner according to its composition.

All brines are concentrated before processing by solar evaporation to increase the lithium content and also to precipitate other salts that could have commercial value like potassium chloride, sodium chloride, potassium sulfate, sodium sulfate or boric acid, as well as other double salts like silvinite, carnalite, bishoffite, schoenite, kainite, glasserite, glauberite, epsonite, singenite, etc. Natural brines are richer in sulfates and chlorides, especially the latter.

The largest of the salt mines being exploited currently is the Atacama Salt Mine in Chile, which is estimated to contain about 30% of the total lithium commercially exploitable in the world. This salt mine was first evaluated for commercial exploitation in the 1970s, and the first plant to produce lithium carbonate started production in 1984.

The brines are pumped from the salt mine and are evaporated in large shallow pools, where a sequential crystallization of the salts is started. Since the brines of chlorides are generally saturated with sodium chloride, the first salt to be precipitated is halite, or if sulfates are present, halite and hydrated calcium sulfate. The precipitation continues with silvinite (KClNaCl) and afterward silvite (KCl). The latter is a product for industrial use so that toward the end of the precipitation of the silvite, the brine is transferred to another pool and the precipitated salt thereof is recovered for obtaining potassium chloride by differential floatation. Continuing afterward with the precipitation produces crystallizing of carnalite (KClMgCl$_2$6H$_2$O) and then bishoffite (MgCl$_2$6H$_2$O). In this stage, the lithium is increased to about 4.5%, with a magnesium content of about 4%. Due to the fact that in the further chemical purification of the brine it is costly and complex to treat brines with high magnesium content (about 2%), the crystallization of the brine continues until 5.5% to 6% lithium is obtained. At that point, the conditions are such that lithium carnalite (LiClMgCl$_2$6H$_2$O) is precipitated, which decreases the overall lithium recovery from the brine. However, it is possible to lixiviate the lithium carnalite with fresh brine to recover part of the lithium content. The brine with high lithium concentration contains between 35% to 40% of LiCl, apart from 1% to 4% magnesium, and 0.5% to 1.5% of boron, as magnesium, calcium, and lithium borates.

The three main uses for lithium are currently found in the aluminum electrowinning industry, where they are added as lithium chloride of high purity to the electrolyte of fused salts (cryolite); in the high quality ceramics industry, to which lithium carbonate of high purity is added; and in the production of metallic lithium, wherein lithium chloride of high purity is used as an electrolyte together with potassium chloride.

Even though it is possible to obtain purified lithium chloride directly from chlorine brines, this way is complex and costly, and it is usually preferred to purify the chlorine brines and to precipitate the lithium in the form of carbonate, which will then be transformed into lithium chloride by reaction with hydrochloric acid. For example, Brown, Jacobs, and Boryta (U.S. Pat. No. 4,271,131 of 1981) suggest to carry out an evaporation of the brines until about 3% lithium is obtained and afterward to treat them with calcium hydroxide and calcium chloride for precipitating the boron as hydrated sulfate. However, the latter step also precipitates a considerable part of the lithium from the brine. The rest of the boron must be eliminated later therefrom, since the process does not remove more than 50% of the same.

The presence of impurities in the lithium chloride must be kept to a minimum, normally lower than 0.5% as a whole, particularly some impurities such as magnesium and calcium which can be co-precipitated with the lithium. Another frequent impurity that appears in natural brines is boron. In the production of metallic lithium by the electrolysis of fused salts, the boron must be eliminated before the production of the purified lithium chloride since, otherwise the boron would accumulate in the electrolyte, thus lowering its conductivity with a subsequent decrease in production capability of the cells. The same occurs in the cells during the electrowinning of aluminum, where lithium chloride is added to the cryolite electrolyte for improving its electric conductivity in such a way that the lithium carbonate—from which the lithium chloride is generally obtained for electrochemical uses—must comply with a strict level of boron.

Therefore, the elimination of impurities from natural brines requires that the boron be removed first, before other impurities such as calcium or magnesium. Otherwise, the boron later precipitates along with the lithium carbonate in the form of lithium borate or lithium tetraborate, which is difficult to eliminate later from the carbonate.

The purification of natural brines only through fractionated crystallization has proven to be a costly process of low yield, so other options must be found that are more suitable, especially for eliminating boron, magnesium and calcium.

SUMMARY OF THE INVENTION

It is an object of the present invention to provide a process for producing lithium carbonate from brines.

Another object of the present invention is to provide a process for producing lithium carbonate of high purity.

A further object of the present invention is to provide a method for producing lithium carbonate that is economical and efficient.

These and other objects of the present invention have been obtained by a process which comprises:

(a) acidifying a brine, which comprises at least lithium, magnesium, boron and water, by mixing an acid therewith so as to maintain a pH of the brine of from 0 to 4 in order to form boric acid, said pH being measured by diluting the acidified brine with water in a ratio of 1:10;

(b) removing said boric acid by crystallization to produce a boron-depleted brine;

(c) removing boron from said boron-depleted brine by treating said brine with an organic extractant to thereby produce a boron-free brine;

(d) diluting said boron-free brine with a mother liquor;

(e) removing magnesium from said diluted brine by adding sodium carbonate thereto and precipitating and separating magnesium carbonate therefrom to form a magnesium-depleted brine;

(f) removing magnesium from said magnesium-depleted brine by adding calcium hydroxide thereto and precipitating and separating magnesium hydroxide therefrom to form a magnesium-free brine;

(g) adding sodium carbonate to said magnesium-free brine to form and precipitate lithium carbonate; and (h) separating said lithium carbonate from said brine to thereby obtain a lithium carbonate cake and said mother liquor having a lithium content of 0.1% to 0.3%, by weight.

In the invention, the brines are purified in sequential form, so that the first part of the boron is removed as commercial boric acid and then the rest of the boron is removed by means of solvent extraction utilizing an organic extractant. The brine devoid of boron is then purified in two stages. In the first stage, the brine is diluted with mother liquor generated in the precipitation stage of the lithium carbonate, or with similar brines, precipitating then over 70% of the magnesium contained in the brine utilizing a solution of sodium carbonate (soda ash), and precipitating only a minimum quantity of lithium carbonate together with the magnesium. The rest of the magnesium residue is precipitated in a second purification stage, where calcium hydroxide (milk of lime) is added for precipitating the magnesium as a hydroxide. Any calcium that enters into the solution from the milk of lime is precipitated as carbonate due to the sodium carbonate which is present in the solutions. Finally, the lithium is precipitated warm from the purified brine by adding sodium carbonate, obtaining thereby a high-quality product with a minimum of impurities and with a low cost of production.

In the invention, the initial dilution of the brine with mother liquor establishes a fundamental difference with the other existing processes, since it allows a precipitation of over 70% of the magnesium in the first purification stage with less than 3% of co-precipitation of lithium. This is, in contrast to the processes in which, when precipitating the magnesium as magnesium carbonate directly from the concentrated brine, 10% to 25% of the lithium content is co-precipitated and thus lost. For example, the Chilean patent 37,337 (1989) of Brown and Boryta establishes a process for producing lithium carbonate, which includes precipitating the magnesium and calcium "by known chemical methods," without specifying any condition. If the methods known from the literature were used for precipitating them, especially magnesium, the lithium co-precipitation would lie between 20% and 60%. Such a method is not commercially applicable.

The initial dilution of the brine in the present invention further provides a better and more precise control of the final magnesium and calcium content in the brine. The lithium carbonate thus obtained is of high grade with a high yield and with a global recovery of lithium from the brine in the range of 80% to 90%. In contrast, the global recovery in other processes does not reach above 70%. Besides this, an important part of the sodium carbonate contained in the mother liquor is recovered.

DETAILED DESCRIPTION OF THE INVENTION

Figure 1:
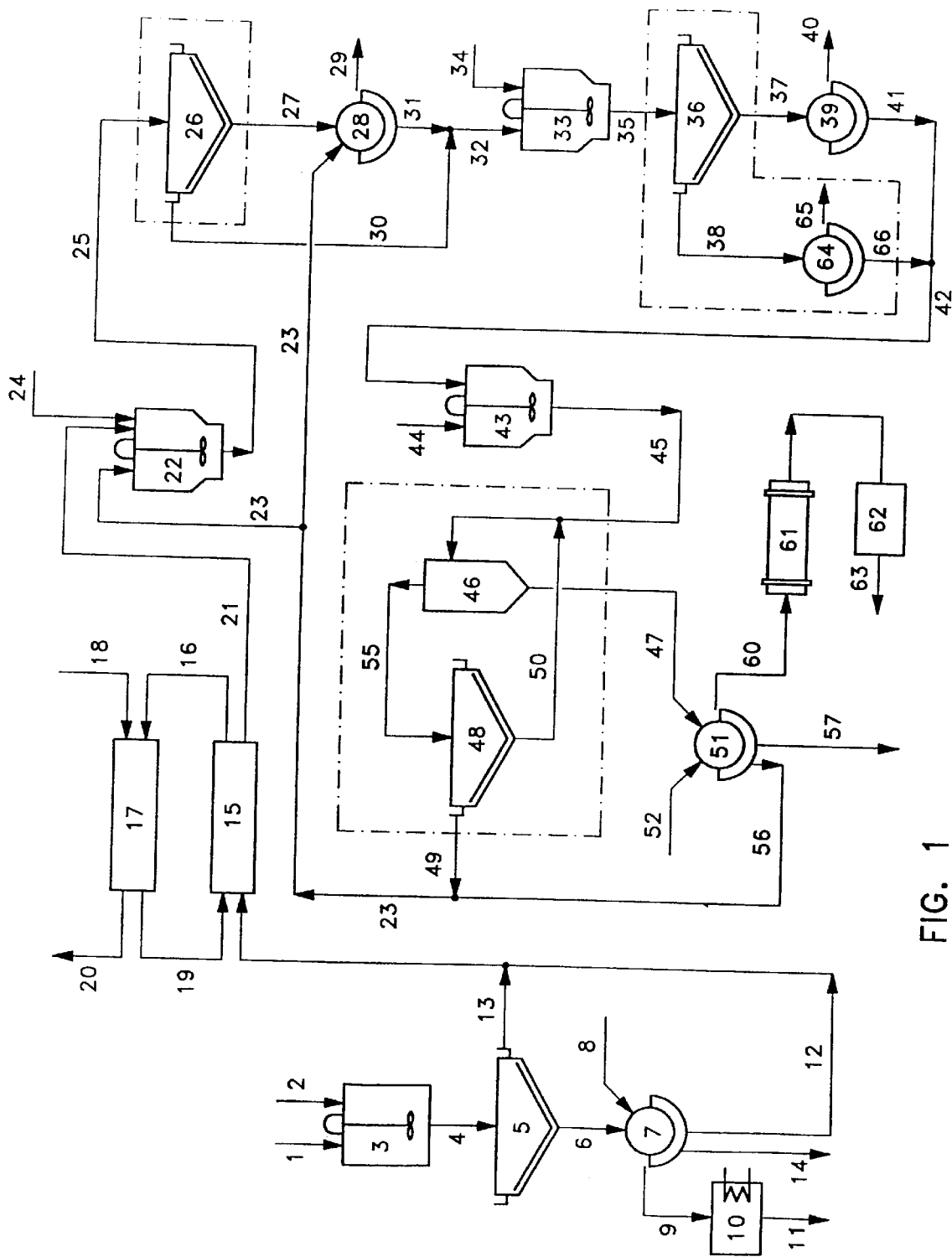
FIG. 1 shows a diagram of a process according to the present invention.

For a better description of the process, a detailed description thereof will be made on the basis of a preferred embodiment, which shall have only an illustrative and non-limiting character.

Brine 1 of the salt mine has a typical composition expressed in % by weight as follows:

| Boron | 0.5 | 1.5% |
| --- | --- | --- |
| Chlorine | 30 | 38% |
| Magnesium | 1 | 2.5% |
| Lithium | 5 | 7% |
| Sodium | 0.01 | 0.15% |
| Potassium | 0.01 | 0.02% |
| Calcium | 0.02 | 0.05% |
| Sulfate | 0.01 | 0.03% |
| Water | 50 | 60% |

Brine 1 is treated with an acidic solution 2 of hydrochloric acid, sulfuric acid or the like and is subjected to a mixing 3 in a suitable equipment, such as a stirred tank or static mixer, in such a way that the acidity is maintained in a pH range of 0 to 4. The acidity is measured by diluting the acidified brine with water in a proportion of brine to water of 1 to 10. The acidification results in precipitating boric acid according to the following typical reactions for the case where hydrochloric acid is used.

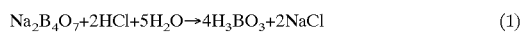

$Na_2B_4O_7 + 2HCl + 5H_2O \rightarrow 4H_3BO_3 + 2NaCl$ (1)

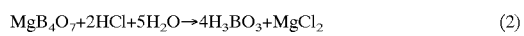

$MgB_4O_7 + 2HCl + 5H_2O \rightarrow 4H_3BO_3 + MgCl_2$ (2)

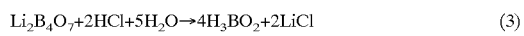

$Li_2B_4O_7 + 2HCl + 5H_2O \rightarrow 4H_3BO_2 + 2LiCl$ (3)

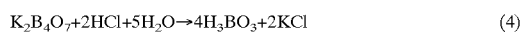

$K_2B_4O_7 + 2HCl + 5H_2O \rightarrow 4H_3BO_3 + 2KCl$ (4)

Brine 4 treated in this way is allowed to crystalize by cooling at temperatures of −5 to 20° C. using suitable equipment such as a thickener or clarifier 5 from which the produced dense pulp 6 can be separated in a solid/liquid separator (S/L) 7, such as with a disc filter or press filter. It is washed with cold water 8 for eliminating impurities trapped in the liquid retained in the crystals. The obtained boric acid 9 is of high purity and is subjected to a drying step 10 at a temperature of 0 to 80° C. for obtaining dry commercial boric acid 11.

The filtrate 12 from the solid/liquid separation stage 7 is added to the brine of the overflow 13 of the thickener 5 and follows in the process. The washing water 14 of the boric acid obtained during the filtration stage 7 can be discarded.

The brine of the overflow 13, mixed with the filtrate 12, normally has a boron content of 0.3% to 0.5% by weight and can be subjected to an extraction by solvent process 15 for extracting the rest of the boron in one or more extraction stages. The extraction solvent can be an organic solvent. This extraction stage is carried out preferably with a pH of 0 to 5, measured for a dilution of the brine in water of 1:10, using an organic/brine ratio of 1/5 to 5/1.

The charged organic extractant 16 is subjected to one or more stages of stripping or re-extraction 17 using an alkaline aqueous solution 18 such as sodium hydroxide, potassium hydroxide, or the like, at a concentration of preferably between 0.02 and 2.0 mol, with an organic/aqueous ratio of 1/5 to 5/1.

The discharged organic extractant 19 is returned to the initial extraction circuit 15, while the aqueous 20 containing the boron can be discarded or used for recovering the boron, depending on the content level of the same.

The brine 21, virtually devoid of boron or with a boron content of less than 5 parts per million (i.e., "boron-free brine"), is then further purified for eliminating the remainder of the other metals contained therein, such as magnesium and calcium, before the precipitation of the lithium carbonate.

In the first stage of purification, the brine 21 passes to a reactor 22, where it is diluted with mother liquor 23 of the precipitation stage of lithium carbonate which will be defined further below. The mother liquor 23 has a lithium content of 0.1 to 0.3% by weight and a sodium content of 6 to 9.5% by weight. This dilution of the brine 21 with mother liquor 23 lowers the content of lithium in the brine from 4–6% to 0.9 to 1.5%, which prevents the precipitation of large amounts of lithium during the precipitation of the magnesium with sodium carbonate.

The brine 21 diluted with mother liquor 23 is reacted in the reactor 22 with a solution of sodium carbonate 24 of 20 to 30% by weight for maintaining a pH of 7 to 9 at a temperature between 15 and 95° C. for a time span of 5 to 120 minutes. Under these conditions, 60 to 95% of the magnesium contained in the brine is precipitated in the form of magnesium carbonate according to the following reaction:

$$MgCl_2 + Na_2CO_3 \rightarrow MgCO_3 + 2NaCl \tag{5}$$

At 80° C., the solubility constant of magnesium carbonate is $3.5 \times 10^{-3}$ with a pH of 8.

The resulting pulp 25 is optionally thickened in a suitable equipment such as a thickener 26 and the thickened pulp 27 (or the pulp 25, in the case that no thickening stage 26 is existent) is subjected to a solid/liquid separation step 28 at a temperature between 50 and 95° C., utilizing, for example, a drum filter, and the cake of magnesium carbonate is washed with mother liquor 23 at a temperature between 30 and 95° C.

The magnesium carbonate cake 29 of the filter obtained in the separation step 28 is discarded.

The clear brine 30 of the optional thickening stage 26 is mixed with the filtrate 31 to form purified brine 32, which is sent to a second purification stage. The purified brine 32 with 0.01% to 0.05% by weight of magnesium is subjected to a precipitation step, for which it is fed into a reactor 33 together with a solution of calcium hydroxide 34 (milk of lime) of 5 to 50% by weight, maintaining a mole ratio $Na_2CO_3/Ca(OH)_2$ of 0.3 to 2, being mixed at a temperature of 50 to 95° C. and for a time span of 5 to 180 minutes, maintaining a pH of 8 to 10. Under these conditions, the rest of the magnesium contained in the brine precipitates together with the calcium. The reactions which occur are the following:

$$MgCO_3 + Ca(OH)_2 \rightarrow Mg(OH)_2 + CaCO_3 \tag{6}$$

$$MgCl_2 + Ca(OH)_2 \rightarrow Mg(OH)_2 + CaCl_2 \tag{7}$$

$$CaCl_2 + Na_2CO_3 \rightarrow 2NaCl + CaCO_3 \tag{8}$$

The precipitated pulp 35 can be decanted in a suitable equipment, such as a thickener 36 and the dense pulp 37 (or the precipitated pulp 35 in the case that the optional thickening stage 36 is not applied) is subjected to a separation step 39 at a temperature of 50 to 95° C. utilizing, for example, a press filter. The magnesium hydroxide and calcium carbonate cake 40 is discarded, while the eventual purified brine 38—with magnesium levels below 0.002% by weight (i.e., "magnesium-free brine") and of calcium levels lower than 0.005% by weight—from the overflow of the thickener 36, and the filtrate 41, obtained in the separation step 39, are sent together as brine 42 to a lithium carbonate precipitation stage in a reactor 43. If purified brine 38 contains suspended magnesium hydroxide particles can eventually be filtered in a filter 64, for example in a press filter, generating a magnesium hydroxide cake 65, which is discarded, and filtered brine 66, which is added to the filtered brine 41 for originating a filtered brine 42.

In the reaction stage 43 (precipitation of lithium carbonate), the brine 42 with a lithium content of 0.8% to 1.2% is reacted with a solution of 20% to 30% by weight of sodium carbonate (soda ash) 44 for maintaining a pH of 8 to 12. The reaction temperature is maintained at 50 to 98° C. and the total reaction time is between 5 to 180 minutes.

Under these conditions, 40% to 90%, typically 80%–90%, of the lithium contained in the brine precipitates according to the following reaction:

$$2LiCl + Na_2CO_3 = Li_2CO_3 + 2NaCl \tag{9}$$

The precipitated lithium carbonate pulp 45 can be subjected to a solid/liquid separation stage comprised by a first solid/liquid separation substage 46 and a second solid/liquid separation substage 48. This first solid/liquid separation substage 46 is realized preferably in a hydrocyclone or in a series of hydrocyclones, whereby a dense pulp 47 is obtained. The dense pulp 47 is then subjected to a separation step 51, for example in a drum filter, in a belt filter or centrifuge, followed by a wash with demineralized or soft water 52 at 60–98° C. In order to avoid dissolving an excess amount of lithium carbonate in the wash water, the temperature must be maintained above 60° C., since lithium carbonate has an inverse solubility with respect to temperature (i.e., 1.52% at 0° C. and 0.71% at 100° C.).

The overflow 55 of the first solid/liquid separation substage 46, which contains the finer particles of lithium carbonate, is subjected to a second separation substage 48, realized preferably in a thickener, and its underflow 50 is returned to the first solid/liquid separation substage 46 (or hydrocyclones).

In the case that the solid/liquid separation stages 46 and 48 are not applied, the solids present in the precipitated pulp 45 of the reactor 43 are separated directly in the solid/liquid separator 51, which can be a band filter or centrifuge, and also washed with demineralized or soft water 52 at 60–98° C.

The strong filtrate 56 of the liquid/solid separator, as well as the eventual pool 49 of the second optional solid/liquid separation stage 48, contain between 0.1% and 0.3% by weight of lithium and generates, in this way, a mother liquor 23, which is utilized for diluting the brine 21 entering the purification stage of the reactor 22 with lithium, and also for washing the magnesium carbonate cake 27 (or 25, in the case where the optional thickening stage 26 is not used) which enters into the separation stage 28 as indicated previously.

The filtrate 57 resulting from the washing of the lithium carbonate cake formed in the separator 51 is used for preparing the sodium carbonate solution 24, which participates in the first purification stage in the reactor 22, as well as for preparing the calcium hydroxide solution 34, which enters into the reactor 33, and the sodium carbonate solution 44, which enters into the reactor 43, increasing in this way the global lithium recovery of the process.

The lithium carbonate cake 60 obtained in the solid/liquid separation stage 51 has typically 15% to 35% humidity and is dried in a suitable dryer equipment 61, such as a rotary dryer, using preferably hot air or gas at temperatures of 500 to 1000° C., before its eventual granulation, compaction, and packing 62. The lithium carbonate 63 obtained in this manner is of high purity with over 99.2% $Li_2CO_3$ and less than 0.8% of impurities.

The present application claims the benefit of priority under 35 U.S.C. §119 from Chilean patent application 484-96, filed Mar. 28, 1996, the entire contents of which are hereby incorporated by reference.

The following is an example of the process of the present invention.

EXAMPLE

A brine from the Atacama salt mine, which has been previously concentrated by solar evaporation, had the following composition by weight:

| | |
|---|---|
| Lithium | 5.9% |
| Boron | 0.8% |
| Chlorine | 35.8% |
| Magnesium | 1.75% |
| Sodium | 0.07% |
| Potassium | 0.02% |
| Calcium | 0.04% |
| Sulfate | 0.02% |
| Water (cryst.) | 54.1% |

This brine was treated with a solution of hydrochloric acid of 35 weight % of concentration for maintaining a constant value for the pH of 1.8, measured in a brine/water dilution of 1/10, mixing the same in a stirred tank. The acidified brine was cooled for 12 hours at 10° C., precipitating in this way 71.0% of the boron content as boric acid. The boric acid crystals were washed with distilled water at 10° C. The boric acid obtained had a purity of 99.2% $H_3BO_3$, with a global recovery of 68.3% with respect to the initial boron contained in the brine.

The brine, with a boron residue of 0.25% and a pH of 1.8, was treated by means of solvent extraction utilizing a mixture of 80% by volume of 2-ethyl-1,3-hexanediol, 5% by volume of isooctyl alcohol, and 15% by volume of tributyl phosphate, dissolved in an aromatic solvent (Escaid 100) in a proportion of 20% of the extractant mixture and 80% of Escaid 100.

The brine was treated in five extraction stages with an organic/brine ratio equal to 4/1, a contact time of 8 minutes, and a settling time of 22 minutes.

The brine without boron showed under analysis a boron residue of 0.005% by weight. The charged organic extractant was treated with a solution of 0.25 mol of sodium hydroxide with an organic/aqueous ratio of 2/1, and in four re-extraction stages with a retention time of 5 minutes per stage, and was then allowed to settle for 8 minutes per stage for separating the phases. The boron-free organic extractant obtained was returned to the extraction stage, while the alkaline solution had a boron content of 1.8% in volume.

The brine obtained, virtually devoid of boron, with a content of 5.8% by weight of lithium and 0.07% by weight of sodium was then mixed with mother liquor (obtained during the filtration in the lithium carbonate precipitation stage). The brine/mother liquor ratio was 1/5 for obtaining a lithium concentration of 1.20% by weight. The diluted brine was treated with a solution of 25% by weight of sodium carbonate for maintaining a pH of 9.5 at a temperature of 82° C. during a reaction time of 90 minutes.

The treated pulp was decanted in a thermally insulated thickener so as to maintain the temperature above 75° C. The dense pulp was filtered in a vacuum filter and a magnesium carbonate cake was obtained which was washed with two volumes of mother liquor before discarding. The filtrate obtained, together with the clear liquid, which represents the brine in this first purification stage, now contained 0.025% magnesium and was treated in a second purification stage with a solution saturated with calcium hydroxide for maintaining a constant pH of 10.2 at 80° C. and for a time span of 30 minutes.

The resulting pulp was hot filtered in a press filter with 60 lbs. of pressure. The cake was washed with 2 volumes of mother liquor and a purified brine with 0.0008% magnesium and 0.001% calcium was obtained in this manner.

The purified brine was finally treated with a solution of 25% sodium carbonate for maintaining the pH of 10.5 at a temperature of 90° C. and for a reaction time of 45 minutes. The resulting pulp was hot thickened at 80–85° C. and the dense pulp obtained was hot filtered in a vacuum filter at 80° C. and the lithium carbonate cake was washed in the filter with demineralized water at 90° C.

The lithium carbonate cake was dried at 200° C. for 30 minutes and a lithium carbonate was obtained finally which showed the following chemical analysis (in % by weight):

| | |
|---|---|
| $Li_2CO_3$ | 99.2 |
| B | 0.0005 |
| Na | 0.06 |
| K | 0.0005 |
| Mg | 0.006 |
| Cl | 0.006 |
| Ca | 0.04 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A process for producing lithium carbonate from natural or industrial brines, which comprises:
   (a) acidifying a brine, which comprises at least lithium, magnesium, boron and water, by mixing an acid therewith so as to maintain a pH of from 0 to 4 and to form boric acid, said pH being measured by diluting the acidified brine with water in a ratio of 1:10;
   (b) removing said boric acid by crystallization and separating boric acid crystals from said brine to produce a boron-depleted brine;
   (c) removing residual boron from said boron-depleted brine by treating said brine with an organic extractant to thereby produce a boron-free brine;
   (d) diluting said boron-free brine with at least a portion of a mother liquor generated in a lithium carbonate precipitation step;
   (e) removing magnesium from said diluted brine by adding sodium carbonate thereto and precipitating and separating magnesium carbonate therefrom to form a magnesium-depleted brine, said removing step (e) results in the removal of 60 to 95%, by weight, of the magnesium contained in said diluted brine;
   (f) removing residual magnesium from said magnesium-depleted brine by adding calcium hydroxide thereto and precipitating and separating magnesium hydroxide therefrom to form a magnesium-free brine;
   (g) adding sodium carbonate to said magnesium-free brine to form and precipitate lithium carbonate;
   (h) separating said lithium carbonate from said brine to thereby obtain a lithium carbonate cake and said mother liquor having a lithium content of 0.1 to 0.3%, by weight.

2. The process according to claim 1, wherein said boron-free brine has a lithium content of 4 to 6%, by weight.

3. The process according to claim 1, wherein said diluting step (d) results in a lithium content of 0.9 to 1.5%, by weight.

4. The process according to claim 1, wherein said removal step (e) comprises reacting said sodium carbonate with said magnesium at a pH of 7 to 9, at a temperature of 15 to 95° C., and for a duration of 5 to 120 minutes.

5. The process according to claim 1, which further comprises thickening the magnesium carbonate-containing brine produced in step (e) prior to separating said magnesium carbonate therefrom.

6. The process according to claim 5, wherein said thickening step produces a clear brine which is subsequently combined with the magnesium-depleted brine from said filtering step.

7. The process according to claim 1, wherein said removing step (f) comprises adding said calcium hydroxide as an aqueous calcium hydroxide solution containing 5 to 50% by weight of calcium hydroxide and maintaining a sodium carbonate:calcium hydroxide mole ratio of from 0.3:1 to 2:1.

8. The process according to claim 7, wherein said precipitation of magnesium hydroxide in said removing step (f) is carried out at a temperature of from 50 to 95° C., at a pH of from 8 to 10, and for a duration of 5 to 180 minutes.

9. The process according to claim 1, which further comprises thickening the magnesium hydroxide-containing brine produced in step (f) prior to separating said magnesium hydroxide therefrom by filtration.

10. The process according to claim 9, wherein said thickening step produces a clear brine which is subsequently combined with the magnesium-free brine generated in said filtering step.

11. The process according to claim 1, wherein said lithium carbonate is precipitated in said step (g) while maintaining a pH of 8 to 12, at a temperature of 50 to 98° C. for a retention time of 5 to 180 minutes.

12. The process according to claim 1, wherein said precipitating step (g) results in the precipitation of 40 to 90% of the lithium contained in the magnesium-free brine.

13. The process according to claim 1, wherein said precipitating step (g) results in the precipitation of 80 to 90% of the lithium contained in the magnesium-free brine.

14. The process according to claim 1, wherein said separating step (h) comprises subjecting said lithium carbonate precipitate-containing brine to a solid/liquid separator to obtain said mother liquor and a lithium carbonate cake and washing said cake with soft water at a temperature of from 60 to 98° C.

15. The process according to claim 1, wherein said separating step (h) comprises subjecting said lithium carbonate precipitate-containing brine to at least one hydrocyclone treatment to obtain a dense pulp of lithium carbonate and a liquid which contains lithium carbonate; and subjecting said dense pulp to a liquid/solid separation treatment to thereby obtain lithium carbonate cake and said mother liquor.

16. The process according to claim 15, which further comprises thickening said liquid which contains lithium carbonate and returning said thickened liquid to said hydrocyclone treatment.

17. The process according to claim 15, which further comprises washing said lithium carbonate cake with soft water at a temperature of from 60 to 98° C.

18. The process according to claim 17, wherein filtrate resulting from said washing is used for preparing a sodium carbonate solution which is used for providing said sodium carbonate of steps (e) and (g).

* * * * *